(12) United States Patent
Panchapakesan (10) Patent No.: US 10,084,789 B2
(45) Date of Patent: *Sep. 25, 2018

(54) PEER TO PEER ENTERPRISE FILE SHARING

(71) Applicant: AIRWATCH LLC, Atlanta, GA (US)

(72) Inventor: Ramani Panchapakesan, Bangalore (IN)

(73) Assignee: AirWatch, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,309

(22) Filed: Dec. 14, 2017

(65) Prior Publication Data

US 2018/0109529 A1    Apr. 19, 2018

Related U.S. Application Data

(63) Continuation of application No. 14/686,827, filed on Apr. 15, 2015.

(30) Foreign Application Priority Data

Dec. 27, 2014 (IN) .......................... 6631/CHE/2014

(51) Int. Cl.
*G06F 17/00* (2006.01)
*H04L 29/06* (2006.01)
*H04L 29/08* (2006.01)

(52) U.S. Cl.
CPC .......... *H04L 63/10* (2013.01); *H04L 63/0428* (2013.01); *H04L 63/083* (2013.01); *H04L 63/0823* (2013.01); *H04L 63/12* (2013.01); *H04L 67/06* (2013.01); *H04L 67/101* (2013.01); *H04L 67/1008* (2013.01); *H04L 67/1021* (2013.01); *H04L 67/1068* (2013.01); *H04L 67/104* (2013.01); *H04L 67/141* (2013.01)

(58) Field of Classification Search
CPC ..... H04L 63/205; H04L 69/24; H04L 67/104; H04L 67/06; H04L 67/1061; H04L 67/1065

See application file for complete search history.

(56) References Cited

U.S. PATENT DOCUMENTS

| | | |
|---|---|---|
| 8,526,924 B1 | 9/2013 | Annan |
| 2003/0233455 A1 | 12/2003 | Leber |
| 2007/0074019 A1 | 3/2007 | Seidel |
| 2008/0285496 A1 | 11/2008 | Fuchs |
| 2009/0158034 A1 | 6/2009 | Gu |
| 2009/0193507 A1 | 7/2009 | Ibrahim |

(Continued)

OTHER PUBLICATIONS

Office Action dated Feb. 14, 2018 for U.S. Appl. No. 15/842,269.
Office Action dated Feb. 8, 2018 for U.S. Appl. No. 15/842,326.

*Primary Examiner* — Daniel B Potratz
(74) *Attorney, Agent, or Firm* — Clayton, McKay & Bailey, PC (57) ABSTRACT

Disclosed are various embodiments for facilitating the distribution of files from a file repository. Files from a file repository can be distributed via peer to peer transmissions where the peer devices can perform authentication functions. The authentication can be performed based upon metadata associated with the files as well as based upon authentication requests submitted to an authentication server.

20 Claims, 5 Drawing Sheets

(56) References Cited

U.S. PATENT DOCUMENTS

| | | | |
|---|---|---|---|
| 2011/0035503 A1* | 2/2011 | Zaid | H04L 63/0407 |
| | | | 709/228 |
| 2011/0113029 A1* | 5/2011 | Kaal | H04L 67/104 |
| | | | 707/723 |
| 2013/0336161 A1 | 12/2013 | Jung | |
| 2014/0215039 A1* | 7/2014 | Ali | H04L 67/104 |
| | | | 709/223 |
| 2014/0245015 A1 | 8/2014 | Velamoor | |
| 2014/0258395 A1* | 9/2014 | Tng | H04L 67/16 |
| | | | 709/204 |
| 2014/0298012 A1 | 10/2014 | Orsini | |
| 2015/0046466 A1 | 2/2015 | Kaal | |
| 2015/0127733 A1* | 5/2015 | Ding | H04W 4/08 |
| | | | 709/204 |
| 2015/0161409 A1 | 6/2015 | Szebeni | |

* cited by examiner

PEER TO PEER ENTERPRISE FILE SHARING

CROSS-REFERENCE TO RELATED APPLICATIONS

This application is a continuation of U.S. patent application Ser. No. 14/686,827—entitled "PEER TO PEER ENTERPRISE FILE SHARING," and filed Apr. 15, 2015—which is incorporated herein in its entirety. This application is also related to U.S. patent application Ser. No. 15/842,269, entitled "PEER TO PEER ENTERPRISE FILE SHARING", and U.S. patent application Ser. No. 15/842,326, entitled "PEER TO PEER ENTERPRISE FILE SHARING", which have been filed on the same day as this application.

This application is also related to U.S. patent application Ser. No. 14/686,802, entitled "PEER TO PEER ENTERPRISE FILE SHARING" and to U.S. patent application Ser. No. 14/686,804, entitled "PEER TO PEER ENTERPRISE FILE SHARING", which are assigned to the assignee of this application.

BACKGROUND

An enterprise and/or its users may wish to store documents or other files in a file repository. Files associated with a particular user can be stored in a file repository and accessible from an application executed on a user's device or through a browser-based user interface. An enterprise may also wish to secure access to files associated with users by requiring a password or another authentication mechanism in order to access a particular file. In some cases, access to a file repository can be authenticated by an authentication mechanism that ensures that users can access files to which they are entitled.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to retrieving files from a file repository by employing a peer-to-peer distribution mechanism. In one example, a file management application executing on a client device can obtain a file to which the client device or a user associated with the client device is entitled to access by receiving the file from another client device that may have a copy of the file rather than from a file repository in which the file is archived or stored. In this way, accessibility to the file repository may not be required in order to access a particular file to which a user is entitled to access because another client device, or a peer device, that may also have a copy of the file, can directly provide the file to the requesting client device.

In some scenarios, the file repository may be operated or provided by an entity that is not controlled by the user of the client device and/or the operator of a management system that performs management functions on behalf of the client device. In embodiments of the disclosure, the management system can authorize usage of a file repository on behalf of a user, perform user authentication functions, data security or encryption functions, as well as other device management functions on behalf of an enterprise in order to manage devices that are assigned to users of the enterprise. Accordingly, embodiments of the disclosure can facilitate peer-to-peer transfer of files that are associated with a file repository but in a way that also enforces security and access restrictions associated with the files, which can be desirable in an enterprise or corporate environment.

Figure 1:
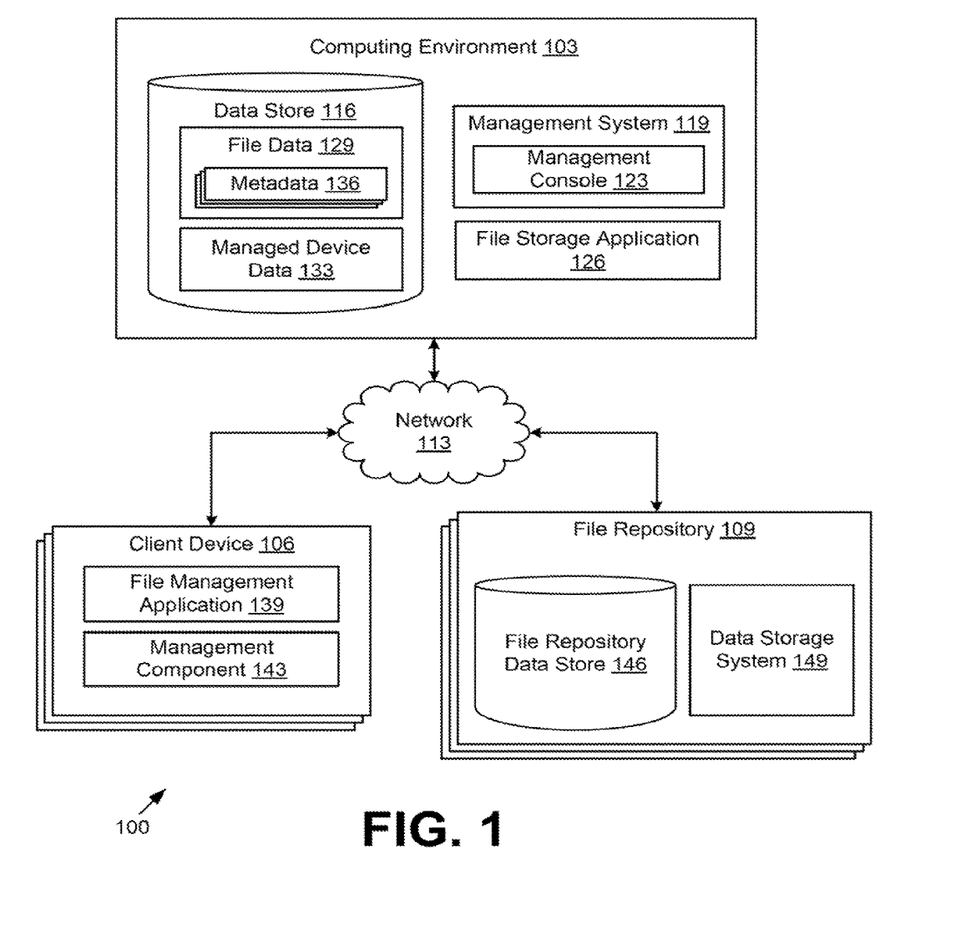
FIG. 1 is a drawing of a networked environment according to various embodiments of the present disclosure.

With reference to FIG. 1, shown is a networked environment 100 according to various embodiments. The networked environment 100 shown in FIG. 1 includes a computing environment 103, a client device 106, a file repository 109, and potentially other components, which are in data communication with each other over a network 113. The network 113 includes, for example, the Internet, one or more intranets, extranets, wide area networks (WANs), local area networks (LANs), wired networks, wireless networks, other suitable networks, or any combination of two or more such networks. Such networks may comprise satellite networks, cable networks, Ethernet networks, telephony networks, and/or other types of networks.

The computing environment 103 may comprise, for example, a server computer or any other system providing computing capabilities. Alternatively, the computing environment 103 may employ multiple computing devices that may be arranged, for example, in one or more server banks, computer banks, or other arrangements. Such computing devices may be located in a single installation or may be distributed among many different geographical locations. For example, the computing environment 103 may include multiple computing devices that together form a hosted computing resource, a grid computing resource, and/or any other distributed computing arrangement. In some cases, the computing environment 103 may operate as at least a portion of an elastic computing resource where the allotted capacity of processing, network, storage, or other computing-related resources may vary over time. The computing environment 103 may also include or be operated as one or more virtualized computer instances that are executed in order to perform the functionality that is described herein.

Various systems may be executed in the computing environment 103. Also, various data is stored in a data store 116 that is accessible to the computing environment 103. The data store 116 shown in FIG. 1 may be representative of multiple data stores 116. The data stored in the data store 116 is associated with the operation of the various components described below.

A management system 119 and/or other systems may be executed in the computing environment 103. The management system 119 may be executed to manage and/or oversee the operation of multiple client devices 106. In some embodiments, an enterprise, such as one or more companies or other organizations, may operate the management system 119 to oversee and/or manage the operation of the client devices 106 of its employees, contractors, customers, etc.

The management system 119 may include a management console 123, a file storage application 126, and/or other components. The management console 123 may facilitate administration of devices of an enterprise by administrators via the management system 119. For example, the management console 123 may generate one or more user interfaces that are rendered on a display device to facilitate interaction with the management system 119. Such user interfaces may facilitate an administrator's inputting of commands or other information for the management system 119. Additionally, the user interfaces may include presentations of statistics or other information regarding the client devices 106 that are managed by the management system 119.

The file storage application 126 may obtain and store various information regarding files that are associated with one or more client devices 106 and/or the management system 119 and that are stored in the file repository 109. The data stored in the data store 116 may include file data 129, managed device data 133, and/or other information. The file data 129 may include entries for each file that is stored in a file repository 109 on behalf of users of an enterprise. For example, file data 129 can include information regarding the storage locations of files, encryption keys, permissions (e.g., access rights), the file version, access history, and/or other information associated with files. In some embodiments, file data 129 includes metadata 136 for a file that includes a file hash that is generated according to a predetermined hash function, a unique identifier for the file, the storage location of the file in the file repository 109, an encryption and/or decryption key, user permissions, the file version, access history, and/or other information for a particular file. For example, the metadata 136 can identify which users or client devices 106 of the enterprise are entitled to access a particular file that is stored in the file repository 109.

The managed device data 133 may include information regarding the client devices 106 that are managed and/or controlled by the management system 119. The managed device data 133 for a particular client device 106 may include, for example, the identification of a user assigned to the client device 106, the identification of applications that are installed in the client device 106, historical data regarding the operation of the client device 106, and/or other information.

In addition, the managed device data 133 for a particular client device 106 may include a set of one or more compliance rules that may be specified by the management system 119. Each compliance rule may specify one or more conditions that must be satisfied for a client device 106 to be deemed complaint with the compliance rule. As a non-limiting example, a compliance rule may specify that particular applications are prohibited from being installed on a client device 106. As another non-limiting example, a compliance rule may specify that lock screen is required to be generated when the client device 106 is "awoken" from a low power (e.g., "sleep") state and that a passcode is required for a user to unlock the lock screen. Additionally, one or more compliance rules may be based on time, geographical location, and/or other predefined conditions such that certain functionality associated with the client device 106 may or may not be permitted based upon the time, geographical location and/or other predefined condition.

The client device 106 is representative of multiple client devices 106 that may be coupled to the network 113. The client device 106 may comprise, for example, a processor-based system such as a computer system. Such a computer system may be embodied in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 may include a display as well as one or more input devices, such as a mouse, touch pad, etc., that facilitates a user input or other types of data input into the client device 106.

The client device 106 may be configured to execute a file management application 139, a management component 143, and/or other components. The file management application 139 may comprise, for example, one or more programs that access, manage, edit, and/or perform other functions with respect to files. As non-limiting examples, a file may include an image, a video, a word processing document, a spreadsheet, etc. In some embodiments, the file management application 139 may be regarded as being a "content locker," because the file management application 139 may cause access to one or more of the files to be restricted. The file management application 139 may generate one or more user interfaces that facilitate a user of the client device 106 being presented with the information that is represented in files. For example, the file management application 139 may render files, such as images, videos, etc. In addition, one or more user interfaces for the file management application 139 may facilitate a user editing the content of a file, such as a word processing document, spreadsheet, images, etc.

In addition, the file management application 139 can facilitate peer-to-peer transmission of files between client devices 106 of different users as well as authentication of a user or a client device 106 as a part of such a peer-to-peer transmission. As will be described herein, such authentication can be performed with or without assistance from an authentication server like the computing environment 103 executing the management system 119 and/or the file storage application 126. In order words, the file management application 139 can perform client-side authentication of another client device 106 that is requesting that the file management application 139 transmit a particular file to the client device 106. Such client-side authentication can be performed based upon the metadata 136 associated with a file that can be obtained from the computing environment 103 and/or the file repository 109.

The management component 143 may be executed in the client device 106 to monitor and/or manage at least a portion of the data, applications, hardware components, etc., for the client device 106. The management component 143 may also identify whether the client device 106 is operating in accordance with the one or more compliance rules that have been assigned to the client device 106. In some embodiments, the management component 143 may function as a device management service that operates as a portion of an operating system for the client device 106. In other embodiments, the management component 143 may function as a device management agent that operates in the application layer of the client device 106 and that monitors at least some of the activity being performed in the client device 106. In other embodiments, the management component 143 may comprise an application wrapper that interfaces with a software component to facilitate overseeing, monitoring, and/or managing one or more resources of the client device 106. Alternatively, the management component 143 may be a portion of an application that was developed, for example, using a Software Development Kit (SDK) that facilitates the inclusion of functionality within the application that monitors and/or manages at least a portion of the resources for the client device 106.

The management component 143 may be executed by the client device 106 automatically upon startup of the client device 106. Additionally, the management component 143 may run as a background process in the client device 106. Accordingly, the management component 143 may execute without user intervention in some embodiments. Additionally, the management component 143 may communicate with the management system 119 in order to facilitate the management system 119 managing the client device 106.

The file repository 109 may comprise, for example, a server computer or any other system providing computing capabilities. Alternatively, the file repository 109 may employ multiple computing devices that may be arranged, for example, in one or more server banks, computer banks, or other arrangements. Such computing devices may be located in a single installation or may be distributed among many different geographical locations. For example, the file repository 109 may include multiple computing devices that together form a hosted computing resource, a grid computing resource, and/or any other distributed computing arrangement. In some cases, the file repository 109 may operate as at least a portion of an elastic computing resource where the allotted capacity of processing, network, storage, or other computing-related resources may vary over time. The file repository 109 may also include or be operated as one or more virtualized computer instances that are executed in order to perform the functionality that is described herein.

The file repository 109 may be operated by an entity that is separate from an entity operating the computing environment 103, such as a storage provider. The storage provider may offer data storage as a service. In other words, the storage provider may provide data storage for multiple users, such as the users of the client devices 106 and/or the entity that operates the computing environment 103. A user of a client device 106 and/or the entity that operates the computing environment 103 may enroll in such a data storage service.

Various systems may be executed in the file repository 109. Also, various data is stored in a file repository data store 146 that is accessible to the computing environment 103. The file repository data store 146 shown in FIG. 1 may be representative of multiple file repository data stores 146. The file repository data store 146 may store files and/or other data for several users.

A data storage system 149 and/or other systems may be executed in the file repository 109. The data storage system 149 may facilitate and manage the storage of data in the file repository data store 146. For example, the data storage system 149 may provide an application programming interface (API) and/or any other suitable interface that facilitates communication between the data storage system 149 and the client device 106 and/or management system 119. In addition, the data storage system 149 may authenticate requests to store and/or retrieve data. Additionally, the data storage system 149 may perform load balancing processes to, for example, facilitate the transfer of data between the file repository data store 146 and other components.

Next, a general description of the operation of the various components of the networked environment 100 is provided. To begin, the file storage application 126 can facilitate the storage of files in a file repository 109 on behalf of a user, enterprise or organization. For example, a user may upload a file or cause a file to be uploaded by an application configured to store files in association with a file storage account or quota of a user. Such a file can be received by the file storage application 126 and/or the data storage system 149. In some embodiments, the file storage application 126 can generate or store metadata 136 that corresponds to the file and the file can be stored by or on behalf of the file storage application 126 in the file repository 109. The metadata 136 can include an identifier for the file, a file hash associated with the file, such as a message-digest algorithm (MD5) hash value or a hash value computed using any other hash function. The metadata 136 can also identify users who are entitled to access or download a particular file that is stored in the file repository 109 and other properties associated with the file. In some scenarios, a file may be stored in the file repository 109 by one user and made available to other users of the enterprise. In such a scenario, the file storage application 126 can entitle these other users to the file by updating access permissions stored in the metadata 136 as well as in the file repository 109.

Accordingly, in order to obtain or access a file stored in the file repository 109, the file management application 139 can generate a request to obtain the file that is transmitted to the file storage application 126 and/or the data storage system 149 executed by the file repository 109. The data storage system 149 and/or the file storage application 126, or an authentication server executed by either the computing environment 103 or the file repository 109, can determine whether a user associated with the client device 106 is entitled to access the file. If so, then the data storage system 149 can transmit the file to the client device 106 executing the file management application 139.

In one embodiment, the file management application 139 can request all or a portion of the metadata 136 associated with one or more files that the user associated with the client device 106 is entitled to access. The metadata 136 can include a file hash associated with the various files that the user is entitled to access as well as potentially a reference to a location within the file repository 109 in which the file is stored. Embodiments of the disclosure can leverage this metadata 136 to facilitate peer-to-peer transmission of files that are requested by a particular client device 106 as well as authentication of the client device 106 requesting access to the particular file. Accordingly, in one embodiment, it may be the case that another client device 106 coupled to the network 113 may have or store a copy of a particular file requested by the file management application 126 on behalf of a user. Alternatively, another client device 106 may not have or store a copy of a particular file requested, but may a more optimal client device 106 for obtaining the file. For example, this other client device 106 may be connected to a WiFi network, while the requesting client device 106 may only be connected to a cellular network. Therefore, the file management application 139 of a requesting client device 106 can broadcast a request to obtain a particular file to other client devices 106 that may be coupled to the network 113. Such a request can include an identifier associated with the file with which the file can be identified.

Another client device 106, which can be referred to as a sender client device 106, can respond to such a request with an indication that the sender client device 106 has or is capable of obtaining a copy of the requested file and that it can transmit at least a portion of the file to the requesting client device 106. Such a request to obtain the file can be broadcast by the requesting client device 106 to other client devices 106 by various mechanisms. In one embodiment, such a request can be broadcast to a broadcast network address. In another embodiment, such a request can comprise a multicast request. In other words, requesting client device 106 can transmit a request to multiple client devices based upon the physical location or network location of other client devices 106. In some embodiments, such a request can be transmitted using a localized communication interface, such as a Bluetooth capability of the client devices 106. The request that is broadcast by the requesting client device 106 can include various device status parameters as well as an identifier with which the requested file can be identified.

If a particular client device 106 receiving such a request has a copy of the requested file, it can respond to the request with an interrogator response. The interrogator response can include device status parameters associated with the client device 106 receiving the request. In one embodiment, the device status parameters associated with the client device 106 can be detected by the management component 143. The device status parameters included within the request for the file and/or the interrogator response can include information describing the sender client device 106, for example, a device operating system, one or more supported file transfer protocols, a battery life parameter indicating how much remaining battery life a client device 106 possesses, a device manufacturer, and other device information. Because a requesting client device 106 may receive more than one interrogator response to a request for a file, the requesting client device 106 can select a sender client device based upon the device status parameters included within the interrogator response.

For example, the sender client device 106 can be selected based upon compliance of the sender client device 106 with one or more compliance rules. If a particular client device 106 does not comply with a particular compliance rule, such as a rule with respect to whether the sender client device 106 has been modified or has certain software installed thereon, the client device 106 may not be selected as the sender client device 106. Compliance with a compliance rule can also take the form of a determination with respect to whether matches device status parameters of a requesting client device 106. For example, the sender client device 106 can be selected based upon whether the operating system, device manufacturer or any other property of the sender client device 106 matches that of the requesting client device 106. The sender client device 106 can also be selected based upon whether a particular file transfer protocol is supported by both devices. For example, if both devices support Wi-Fi direct or any particular proprietary or open file transfer protocol, the requesting client device 106 can select the sender client device 106 based upon this parameter. Additionally, the sender client device 106 can also be selected based upon network latency properties with respect to communications between the requesting client device 106 and sender client device 106. In one embodiment, the responding client device 106 having the least network latency with respect to the requesting client device 106 can be selected as the sender client device 106. As another example, the sender client device 106 can be selected based upon a physical proximity of the sender client device 106 to the requesting client device 106 based upon a physical location of the sender client device 106. Additionally, the sender client device 106 can also be selected based upon a signal strength with respect to a communication interface, such as Bluetooth or Wi-Fi, between the sender client device 106 and requesting client device 106.

The sender client device 106 can also be selected based upon a degree of battery life, a charging state (i.e. whether the device is charging), or any other status parameter of the sender client device 106. For example, a client device 106 with relatively low battery life or battery life that does not meet a particular threshold may not be selected so as to avoid further reducing the battery life of the client device 106. In some embodiments, the client device 106 receiving a broadcasted request for a file can also avoid generating and/or transmitting an interrogator response if its battery life does not meet a threshold. In this way, a potential sender client device 106 can avoid having itself considered as the sender client device 106 in response to a request for a file if battery life or other status parameters or conditions are not met, such as compliance with one or more compliance rules distributed to client devices 106 by the management system 119.

The file management application 139 executed by the requesting client device 106 and sender client device 106 can also perform authentication steps in order to minimize the chance that a malicious actor is operating either device. For example, a sender client device 106 can authenticate the requesting client device 106 to ensure that the requesting client device 106 is entitled or authorized to access the requested file. The requesting client device 106 can authenticate the sender client device 106 to ensure that the sending client device 106 possesses a copy of the file that the requesting client device 106 is actually requesting.

Such authentication can be performed in various ways. In a first embodiment, the client devices 106 can authenticate each other by leveraging the metadata 136 describing the particular file that the requesting client device 106 is requesting, such as a file hash or file identifier associated with the file. First, the file storage application 126 can be configured to only provide metadata 136 about those files to which a particular client device 106 is authorized or entitled to access and only after authenticating the client device 106 and/or user associated with the device. Accordingly, the file storage application 126 can ensure that only those client devices 106 that are authorized to access a particular file are in possession of the metadata 136 associated with the file by requiring authenticated access to the metadata 136 for a file.

Accordingly, in one embodiment, in order to authenticate a requesting client device 106, a sender client device 106 can request that the requesting client device 106 generate an authenticator code or a one-time password that is based upon the file hash of the requested file. Such a one-time password can be generated by employing a secure hash algorithm such as SHA-0, SHA-1, SHA-2, etc. In other words, the requesting client device 106 can generate an encrypted file hash that can be verified by the sender client device 106. The encrypted file hash can be generated using a predetermined or preselected algorithm. The encrypted file hash can be transmitted to the sender client device 106 by the requesting client device 106. The sender client device 106 can then verify the encrypted file hash by independently generating a version of the encrypted file hash from the file hash obtained from the file storage application 126 as metadata 136. If the version of the encrypted file hash generated by the sender client device 106 matches the version sent by the requesting client device 106, the sender client device 106 can authenticate or trust the requesting client device 106.

Next, the sender client device 106 can transmit an encrypted rearranged file hash to the requesting client device 106 for verification or authentication of the sender client device 106. Such an encrypted rearranged file hash can be generated by rearranging or reordering the file hash corresponding to the file according to a predetermined scheme. For example, the file hash can be reversed or scrambled in a predetermined fashion. The rearranged file hash can then be encrypted using a secure hash algorithm and transmitted to the requesting client device 106 as an encrypted rearranged file hash. The requesting client device 106 can then verify the encrypted rearranged file hash by rearranging the file hash according to the predetermined scheme and generating its own version of the encrypted rearranged file hash. The requesting client device 106 can then determine whether a match exists between the generated version and the version received from the sender client device 106. If a match exists, then the requesting client device 106 can authenticate or trust the sender client device 106.

If both the requesting client device 106 and sender client device 106 authenticate one another, the devices can then establish a file transfer session according to a file transfer protocol. The requested file, or a portion thereof, can be transmitted from the sender client device 106 to the requesting client device 106 through the file transfer session. In some embodiments, the requesting client device 106 can also select multiple sender client devices 106 and establish multiple file transfer sessions with the sender client devices 106. In one scenario, the requesting client device 106 can identify a particular portion of a file that a particular sender client device 106 can transmit in the file transfer session. The requesting client device 106 can obtain the remaining portions of the file from one or more other sender client devices 106.

Additionally, the sender client device 106 can apply encryption to the requested file or portion of the file. In one scenario, the file can be encrypted using a public key associated with the requesting client device 106 that can be published and obtained from the file storage application 126. In another scenario, the file can be encrypted using a file-specific encryption key that is obtained from the file storage application 126 or the file repository 109. In some embodiments, the sender client device 106 may not possess the decryption key for a particular file. In such a scenario, the sender client device 106 may not be able to access or decrypt the file but can facilitate transfer of the file from the file repository 109 to the requesting client device 106.

It should be appreciated that in some embodiments, the roles of the requesting client device 106 and sender client device 106 may be reversed in that the requesting client device 106 may generate the encrypted rearranged file hash while the sender client device 106 may generate the encrypted file hash. Additionally, the order in which the requesting client device 106 and/or sender client device 106 generate or transmit requests or responses may also be rearranged. The order in which these steps are discussed herein is but one example.

The requesting client device 106 and sender client device 106 may also authenticate one another with the assistance of the file storage application 126 or an authentication server. Upon selection of a particular client device 106 as a sender client device 106, the requesting client device 106 and sender client device 106 can independently obtain an authentication token, or a one-time password, from the file storage application 126. The requesting client device 106 and sender client device 106 can then exchange these authentication tokens. In other words, the requesting client device 106 can transmit its authentication token to the sender client device 106 and vice versa.

Next, the requesting client device 106 and sender client device 106 can verify the authentication token obtained from the other client device 106 by transmitting an authentication request to the file storage application 126 that includes the authentication token, an identifier associated with the client device 106 from which the authentication token was obtained and/or a file identifier corresponding to the file requested by the requesting client device 106. The file storage application 126 can then verify that the requesting client device 106 is entitled to access the requested file as well as that the sender client device 106 is a legitimate transferor of the file. If the file storage application 126 confirms the authenticity of the client devices 106 and provides an indication to this effect to the respective client devices 106, a file transfer session can be established between the requesting client device 106 and sender client device 106 in which the sender client device 106 can transmit the requested file to the requesting client device 106.

Figure 2:
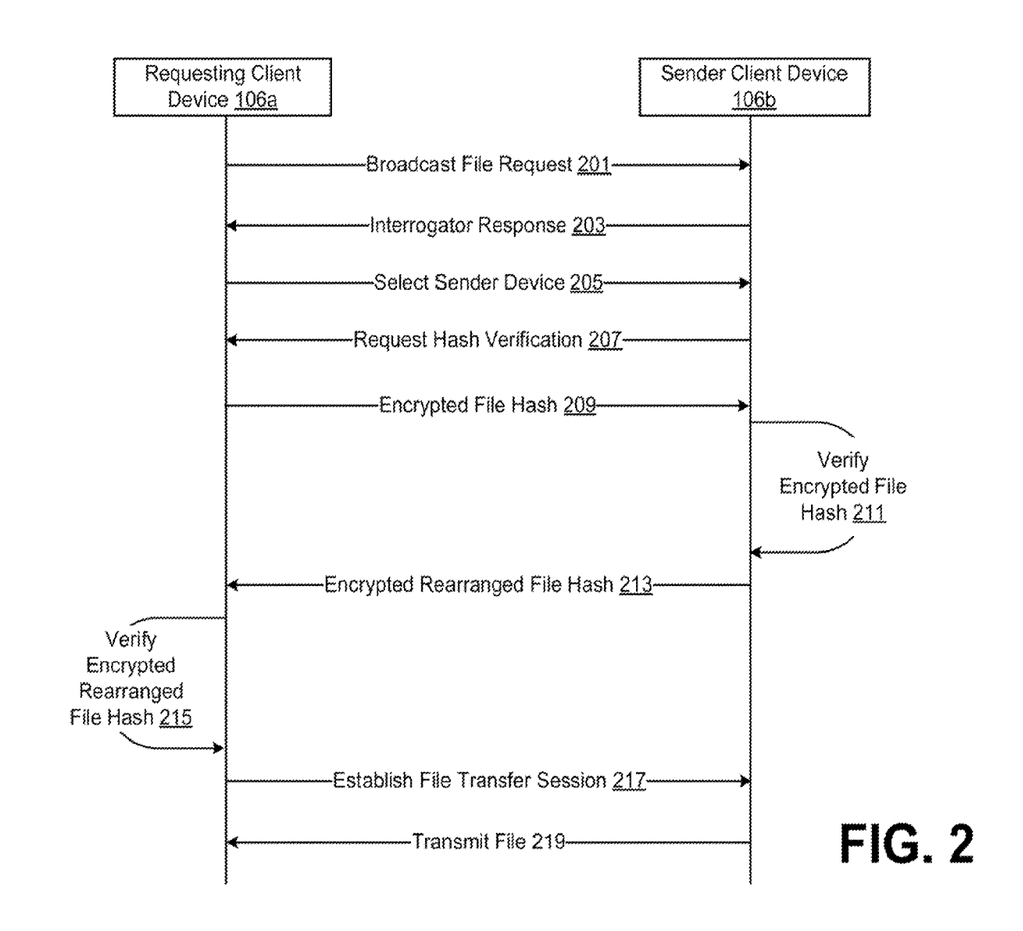
FIG. 2 is a sequence diagram illustrating operation of devices in the networked environment of FIG. 1 according to various embodiments of the present disclosure.

Referring next to FIG. 2, shown is a sequence diagram that illustrates an example of interactions between a requesting client device 106a and sender client device 106b according to various embodiments of the disclosure. In the example of FIG. 2, a requesting client device 106a and the sender client device 106b can perform client-side authentication of one another. First, the requesting client device 106a can broadcast a file request 201 using the network 113, which can be received by the sender client device 106b. As noted above, the file request 201 can be broadcast by sending the request to a broadcast address so that one or more client devices 106 on a subnet receive the request from the requesting client device 106a. Such a request can also comprise a multicast request that is broadcast to multiple client devices 106 coupled to the network 113.

Upon the receiving the file request 201, the sender client device 106b can generate an interrogator response 203 that includes one or more device parameters associated with the status of the sender client device 106b. The interrogator response 203 can be transmitted to the requesting client device 106a. The requesting client device 106a can then select a sender client device 106b by evaluating the compatibility of the information in the interrogator response with various aspects of the requesting client device 106a. Upon selecting the sender client device 106b, the requesting client device 106a can transmit an indication of selection of the sender client device 106b as denoted by arrow 205. In other words, the requesting client device 106a can establish a session with the sender client device 106b in which authentication can now occur.

Accordingly, the sender client device 106b can request hash verification 207 from the requesting client device 106a. The requesting client device 106a can generate an encrypted file hash 209 by performing a one-way encryption of the file hash corresponding to the requested file. The encrypted file hash 209 is transmitted to the sender client device 106b. Next, at arrow 211, the sender client device 106b can independently verify the encrypted file hash by generating its own encrypted version of the file hash and comparing this generated version of the encrypted file hash with the version obtained from the requesting client device 106a.

Upon verifying the encrypted file hash, the sender client device 106b can generate an encrypted rearranged file hash 213 that is transmitted to the requesting client device 106a. Next, at arrow 215, the requesting client device 106a can independently verify the encrypted rearranged file hash by generating its own encrypted version of the rearranged file hash and comparing this generated version of the encrypted rearranged file hash with the version obtained from the sender client device 106b. Upon verifying the encrypted rearranged file hash, the requesting client device 106a can establish a file transfer session 217 with the sender client device 106b in which the file, or a portion thereof, can be transmitted from the sender client device 106b to the requesting client device 106a as denoted by arrow 219.

In some embodiments, the sender client device 106b can also encrypt the file transmitted to the requesting client device 106b, and the requesting client device 106a can decrypt the file. For example, the sender client device 106b can encrypt the file or a portion thereof with a public key associated with the requesting client device 106a, which can then decrypt the received file with a corresponding private key as well as potentially reassemble the received file from various portions of the file received from various sender client devices 106b.

Figure 3:
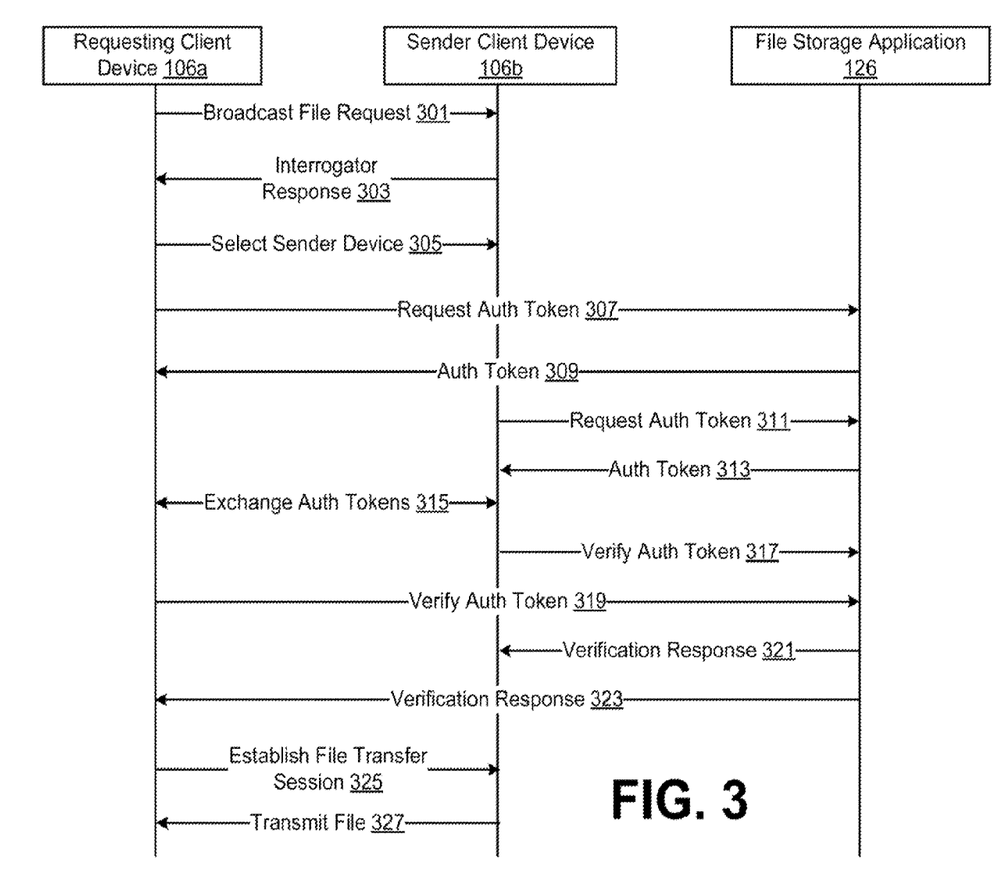
FIG. 3 is a sequence diagram illustrating operation of devices in the networked environment of FIG. 1 according to various embodiments of the present disclosure.

Referring next to FIG. 3, shown is a sequence diagram that illustrates an example of interactions between a requesting client device 106a and sender client device 106b according to various embodiments of the disclosure. In the example of FIG. 3, a requesting client device 106a and the sender client device 106b can perform authentication of one another with assistance from the file storage application 126 or an authentication server. First, the requesting client device 106a can broadcast a file request 301 using the network 113, which can be received by the sender client device 106b. As noted above, the file request 301 can be broadcast by sending the request to a broadcast address so that one or more client devices 106 on a subnet receive the request from the requesting client device 106a. Such a request can also comprise a multicast request that is broadcast to multiple client devices 106 coupled to the network 113.

Upon the receiving the file request 301, the sender client device 106b can generate an interrogator response 303 that includes one or more device parameters associated with the status of the sender client device 106b. The interrogator response 303 can be transmitted to the requesting client device 106a. The requesting client device 106a can then select a sender client device 106b by evaluating the compatibility of the information in the interrogator response with various aspects of the requesting client device 106a. Upon selecting the sender client device 106b, the requesting client device 106a can transmit an indication of selection of the sender client device 106b as denoted by arrow 305.

Accordingly, the requesting client device 106a can request an authentication token from the file storage application 126 as denoted by arrow 307. In response, the file storage application 126 can transmit an authentication token, which can comprise a one-time password, to the requesting client device 106a. The sender client device 106b can request an authentication token from the file storage application 126 as denoted by arrow 311. In response, the file storage application 126 can transmit an authentication token, which can comprise a one-time password, to the sender client device 106b. At arrow 315, the requesting client device 106a and sender client device 106b can exchange the authentication tokens obtained from the file storage application 126.

At arrow 317, the sender client device 106b can verify the authentication token with the file storage application 126. Verification of the authentication token can comprise a request that includes the authentication token, an identifier identifying the requesting client device 106a and/or the file identifier requested by the requesting client device 106a. At arrow 319, the requesting client device 106a can verify the authentication token with the file storage application 126. Verification of the authentication token can comprise a request that includes the authentication token, an identifier identifying the sender client device 106b and/or the file identifier requested by the requesting client device 106a. The file storage application 126 can then provide a verification response to the sender client device 106b and requesting client device 106a as denoted by arrows 321 and 323, respectively.

Upon verification of the respective authentication tokens, the requesting client device 106a can establish a file transfer session 325 with the sender client device 106b in which the file, or a portion thereof, can be transmitted from the sender client device 106b to the requesting client device 106a as denoted by arrow 327.

Figure 4:
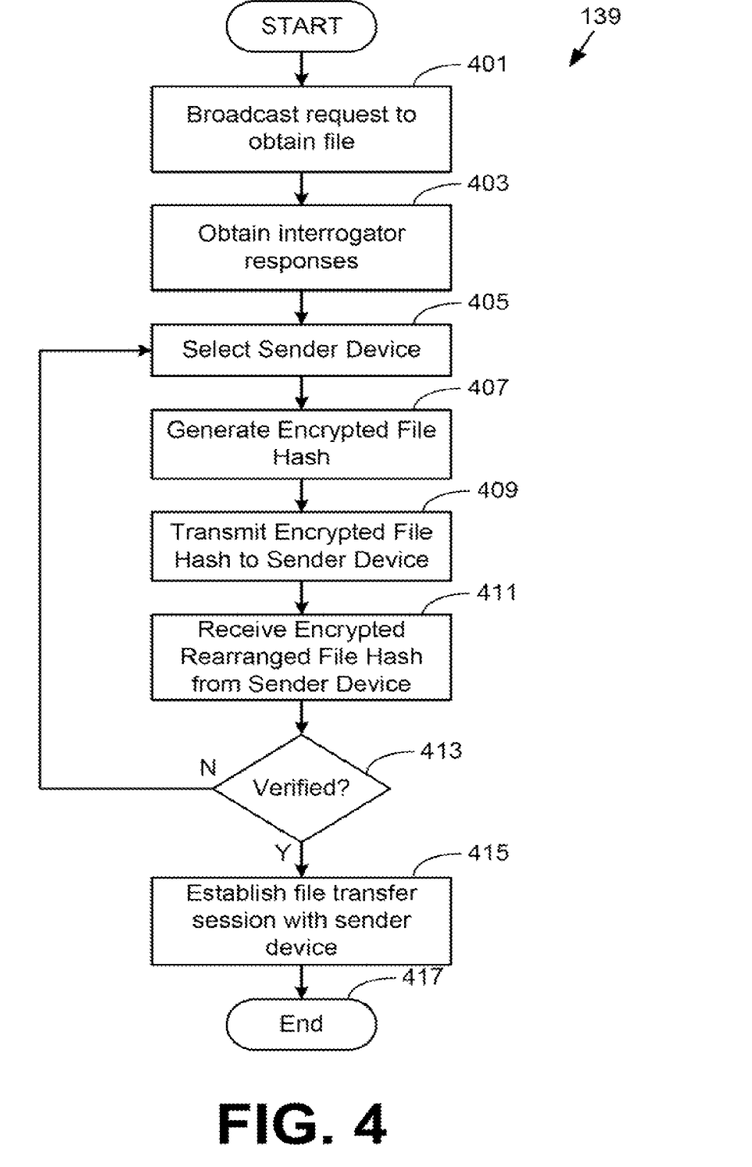
FIGS. 4-5 are flowchart illustrating examples of functionality implemented as portions of components executed in the networked environment of FIG. 1 according to various embodiments of the present disclosure.

Referring next to FIG. 4, shown is a flowchart that provides one example of the operation of a portion of the file management application 139 according to various embodiments. It is understood that the flowchart of FIG. 4 provides merely an example of the many different types of functional arrangements that may be employed to implement the operation of the portion of the file management application 139 as described herein. As an alternative, the flowchart of FIG. 4 may be viewed as depicting an example of elements of a method implemented in the client device 106 according to one or more embodiments. Functionality attributed to the file management application 139 can be implemented in a single process or application executed by the client device 106 and/or multiple processes or applications. The separation or segmentation of functionality as discussed herein is presented for illustrative purposes only.

Beginning with box 401, the file management application 139 can broadcast a request to obtain a particular file to other client devices 106. At box 403, the file management application 139 can obtain a response to the broadcasted request in the form of one or more interrogator responses that include device status parameters that may assist the file management application 139 in selecting a sender client device 106.

At box 405, the file management application 139 can select one or more sender client device 106 based upon the interrogator responses. At box 407, the file management application 139 generates an encrypted file hash from metadata 136 describing the file that can be obtained from the file storage application 126. At box 409, the file management application 139 transmits the encrypted file hash to the sender client device 106. At box 411, the file management application 139 can receive an encrypted rearranged file hash from the file management application 139. At box 413, the file management application 139 can determine, based upon the encrypted rearranged file hash, whether to verify the sender client device 106 by independently generating the encrypted rearranged file hash and determining whether the independently generated encrypted rearranged file hash matches the version obtained from the sender client device 106. If the sender client device 106 is not verified, then the file management application 139 can proceed to box 405 and select another sender client device 106. If the sender client device 106 is verified, at box 415, the file management application 139 can establish a file transfer session with the sender client device 106 in which the file or a portion thereof is received from the sender client device 106. Thereafter, the process proceeds to completion at box 417.

Figure 5:
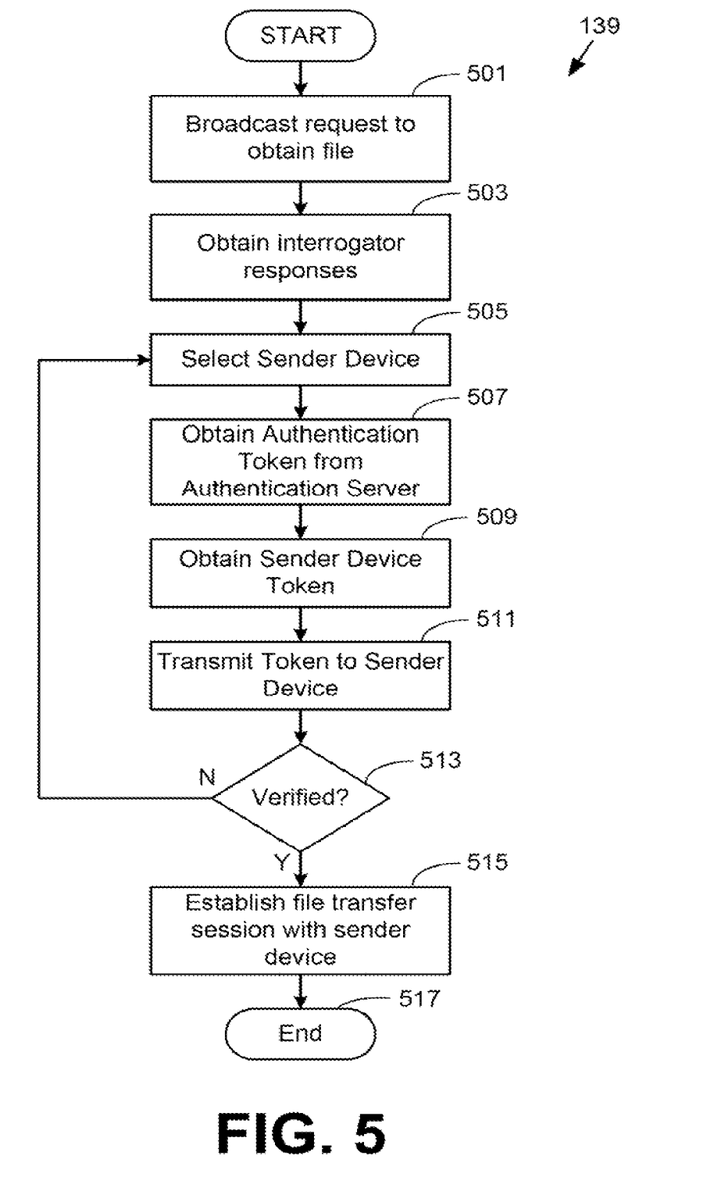

Referring next to FIG. 5, shown is a flowchart that provides one example of the operation of a portion of the file management application 139 according to various embodiments. It is understood that the flowchart of FIG. 5 provides merely an example of the many different types of functional arrangements that may be employed to implement the operation of the portion of the file management application 139 as described herein. As an alternative, the flowchart of FIG. 5 may be viewed as depicting an example of elements of a method implemented in the client device 106 according to one or more embodiments. Functionality attributed to the file management application 139 can be implemented in a single process or application executed by the client device 106 and/or multiple processes or applications. The separation or segmentation of functionality as discussed herein is presented for illustrative purposes only.

Beginning with box 501, the file management application 139 can broadcast a request to obtain a particular file to other client devices 106. At box 503, the file management application 139 can obtain a response to the broadcasted request in the form of one or more interrogator responses that include device status parameters that may assist the file management application 139 in selecting a sender client device 106.

At box 505, the file management application 139 can select one or more sender client device 106 based upon the interrogator responses. At box 507, the file management application 139 obtains an authentication token, or one-time password, from the file storage application 126 or an authentication server. At box 509, the file management application 139 obtains an authentication token from the sender client device 106.

At box 511, the file management application 139 transmits the authentication token obtained from the file storage application 126 to the sender client device 106 so that the sender client device 106 can verify the authentication token. Correspondingly, at box 513, the file management application 139 verifies the authentication token received from the sender client device 106. As noted above, the file management application 139 can verify the authentication token by transmitting the authentication token to the file storage application 126 or authentication server along with an identifier of the requested file as well as an identifier corresponding to client device 106. The file storage application 126 can maintain the authentication tokens issued on behalf of client devices 106 in the data store 116 and verify that the authentication token provided by a client device 106 requesting verification of another client device 106 matches the authentication token stored in the data store 116.

If the sender client device 106 is not verified, then the file management application 139 can proceed to box 505 and select another sender client device 106. If the sender client device 106 is verified, at box 515, the file management application 139 can establish a file transfer session with the sender client device 106 in which the file or a portion thereof is received from the sender client device 106. Thereafter, the process proceeds to completion at box 517.

The flowcharts of FIGS. 4-5 show examples of the functionality and operation of implementations of components described herein. The components described herein can be embodied in hardware, software, or a combination of hardware and software. If embodied in software, each element may represent a module of code or a portion of code that comprises program instructions to implement the specified logical function(s). The program instructions may be embodied in the form of, for example, source code that comprises human-readable statements written in a programming language and/or machine code that comprises machine instructions recognizable by a suitable execution system, such as a processor in a computer system or other system. If embodied in hardware, each element may represent a circuit or a number of interconnected circuits that implement the specified logical function(s).

Although the flowcharts and sequence diagrams show a specific order of execution, it is understood that the order of execution may differ from that which is shown. For example, the order of execution of two or more elements may be switched relative to the order shown. Also, two or more elements shown in succession may be executed concurrently or with partial concurrence. Further, in some embodiments, one or more of the elements shown in the flowcharts may be skipped or omitted. In addition, any number of counters, state variables, warning semaphores, or messages might be added to the logical flow described herein, for purposes of enhanced utility, accounting, performance measurement, troubleshooting aid, etc. It is understood that all such variations are within the scope of the present disclosure.

The computing environment 103, the client device 106, the file repository 109, and/or other components described herein may each include at least one processing circuit. Such a processing circuit may comprise, for example, one or more processors and one or more storage devices that are coupled to a local interface. The local interface may comprise, for example, a data bus with an accompanying address/control bus or any other suitable bus structure.

The one or more storage devices for a processing circuit may store data and/or components that are executable by the one or more processors of the processing circuit. For example, the management system 119, the file management application 139, the data storage system 149, and/or other components may be stored in one or more storage devices and be executable by one or more processors. Also, a data store, such as the data store 116 and/or the file repository data store 146, may be stored in the one or more storage devices.

The management system 119, the file management application 139, the data storage system 149, and/or other components described herein may be embodied in the form of hardware, as software components that are executable by hardware, or as a combination of software and hardware. If embodied as hardware, the components described herein can be implemented as a circuit or state machine that employs any suitable hardware technology. Such hardware technology may include, for example but is not limited to, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs) and complex programmable logic devices (CPLDs)), etc.

Also, one or more or more of the components described herein that comprise software or program instructions can be embodied in any non-transitory computer-readable medium for use by or in connection with an instruction execution system such as, for example, a processor in a computer system or other system. Such a computer-readable medium may contain, store, and/or maintain the software or program instructions for use by or in connection with the instruction execution system.

A computer-readable medium can comprise a physical media, such as, magnetic, optical, semiconductor, and/or other suitable media. Examples of a suitable computer-readable media include, but are not limited to, solid-state drives, magnetic drives, flash memory, etc. Further, any logic or component described herein may be implemented and structured in a variety of ways. For example, one or more components described may be implemented as modules or components of a single application. Further, one or more components described herein may be executed in one computing device or by using multiple computing devices. Additionally, it is understood that terms, such as "application," "service," "system," "engine," "module," and so on, may be interchangeable and are not intended to be limiting unless indicated otherwise.

It is emphasized that the above-described embodiments of the present disclosure are merely examples of implementations to set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a client device, the program, when executed by the client device, being configured to cause the client device to at least:
   broadcast a request to obtain a plurality of status parameters associated with a second client device accessible through a network to which the client device is connected, the second client device storing a copy of a file in addition to a secondary copy of the file stored in a file repository;
   obtain at least one interrogator response to the request to obtain a plurality of status parameters associated with the second client device, the at least one interrogator response comprising at least the plurality of status parameters associated with the second client device, wherein the at least one interrogator response comprises a supported file transfer protocol of the second client device; and
   select a sender client device based at least in part upon the at least one interrogator response to the request to obtain the plurality of status parameters associated with the second client device, wherein the sender client device is selected based at least in part on whether the client device supports the file transfer protocol supported by the second client device.

2. The non-transitory computer-readable medium of claim 1, wherein the program causes the client device to at least:
   authenticate the sender client device; and
   establish a file transfer session with the sender client device in response to the authentication of the sender client device.

3. The non-transitory computer-readable medium of claim 2, wherein the program is further configured to cause the client device to transmit a portion of the file from the client device to the second client device through the file transfer session.

4. The non-transitory computer-readable medium of claim 1, wherein the at least one interrogator response further comprises a battery life parameter associated with the second client device, and wherein the program is further configured to select the sender client device based at least in part upon the battery life parameter.

5. The non-transitory computer-readable medium of claim 1, wherein the sender client device is authenticated based at least in part upon metadata associated with the file, and wherein the program is configured to obtain the metadata associated with the file from at least one of an authentication server or the file repository.

6. The non-transitory computer-readable medium of claim 5, wherein the sender client device is authenticated based at least part upon a one-time password generated from a file hash associated with the file, and wherein the client device authenticates the one-time password by generating the file hash from the metadata associated with the file.

7. The non-transitory computer-readable medium of claim 5, wherein the at least one sender client device is authenticated based at least in part upon an authentication token provided to the client device, and wherein the program is configured to generate a request to authenticate the authentication token that is transmitted to the authentication server.

8. A method, comprising:
   broadcasting a request to obtain a plurality of status parameters associated with a second client device accessible through a network to which the client device is connected, the second client device storing a copy of a file in addition to a secondary copy of the file stored in a file repository;
   obtaining at least one interrogator response to the request to obtain a plurality of status parameters associated with the second client device, the at least one interrogator response comprising at least the plurality of status parameters associated with the second client device, wherein the at least one interrogator response comprises a supported file transfer protocol of the second client device; and
   selecting a sender client device based at least in part upon the at least one interrogator response to the request to obtain the plurality of status parameters associated with the second client device, wherein the sender client device is selected based at least in part on whether the client device supports the file transfer protocol supported by the second client device.

9. The method of claim 8, further comprising:
   authenticating the sender client device; and
   establishing a file transfer session with the sender client device in response to the authentication of the sender client device.

10. The method of claim 8, further comprising causing the client device to transmit a portion of the file from the client device to the second client device through the file transfer session.

11. The method of claim 8, wherein at least one interrogator response further comprises a battery life parameter associated with the second client device, and wherein the method further comprises selecting the sender client device based at least in part upon the battery life parameter.

12. The method of claim 8, further comprising authenticating the sender client device based at least in part upon metadata associated with the file, and obtaining the metadata associated with the file from at least one of an authentication server or the file repository.

13. The method of claim 12, wherein the sender client device is authenticated based at least part upon a one-time password generated from a file hash associated with the file, and wherein the client device authenticates the one-time password by generating the file hash from the metadata associated with the file.

14. The method of claim 12, wherein the at least one sender client device is authenticated based at least in part upon an authentication token provided to the client device, and wherein the program is configured to generate a request to authenticate the authentication token that is transmitted to the authentication server.

15. A non-transitory computer-readable medium embodying a program executable in a client device, the program, when executed by the client device, being configured to cause the client device to at least:
- broadcast a request to obtain a plurality of status parameters associated with a second client device accessible through a network to which the client device is connected, the second client device storing a copy of a file in addition to a secondary copy of the file stored in a file repository;
- obtain at least one interrogator response to the request to obtain a plurality of status parameters associated with the second client device, the at least one interrogator response comprising at least the plurality of status parameters associated with the second client device, wherein the at least one interrogator response comprises a battery life parameter associated with the second client device; and
- select a sender client device based at least in part upon the at least one interrogator response to the request to obtain the plurality of status parameters associated with the second client device, wherein the sender client device is selected based at least in part on the battery life parameter associated with the second client device.

16. The non-transitory computer-readable medium of claim 15, wherein the program causes the client device to at least:
- authenticate the sender client device; and
- establish a file transfer session with the sender client device in response to the authentication of the sender client device.

17. The non-transitory computer-readable medium of claim 15, wherein the at least one interrogator response further comprises at least one supported file transfer protocol of the second client device, and wherein the program is configured to select the sender client device based at least in part upon whether the client device supports the at least one supported file transfer protocol.

18. The non-transitory computer-readable medium of claim 15, wherein the sender client device is authenticated based at least in part upon metadata associated with the file, and wherein the program is configured to obtain the metadata associated with the file from at least one of an authentication server or the file repository.

19. The non-transitory computer-readable medium of claim 18, wherein the sender client device is authenticated based at least part upon a one-time password generated from a file hash associated with the file, and wherein the client device authenticates the one-time password by generating the file hash from the metadata associated with the file.

20. The non-transitory computer-readable medium of claim 18, wherein the at least one sender client device is authenticated based at least in part upon an authentication token provided to the client device, and wherein the program is configured to generate a request to authenticate the authentication token that is transmitted to the authentication server.

* * * * *